United States Patent
Omote et al.

(10) Patent No.: US 6,310,917 B1
(45) Date of Patent: Oct. 30, 2001

(54) PICTURE CODING METHOD

(75) Inventors: Hidenori Omote, Hyogo; Hiroshi Segawa, Tokyo, both of (JP)

(73) Assignees: Mitsubishi Electric System LSI Design Corporation, Hyago; Mitsubishi Denki Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/035,928

(22) Filed: Mar. 6, 1998

(30) Foreign Application Priority Data

Aug. 27, 1997 (JP) ............................. PO9-230963

(51) Int. Cl.$^7$ ..................................... H04N 7/12
(52) U.S. Cl. ......................................... 375/240.12
(58) Field of Search ................... 348/595, 400, 348/415, 390, 420

(56) References Cited

U.S. PATENT DOCUMENTS

| | | |
|---|---|---|
| 5,506,686 | 4/1996 | Auyeung et al. |
| 5,617,150 | 4/1997 | Nam et al. |
| 5,650,860 * | 7/1997 | Uz ........................................ 348/390 |
| 5,801,779 * | 9/1998 | Uz et al. .............................. 348/420 |

FOREIGN PATENT DOCUMENTS

| | | |
|---|---|---|
| 0 563 778 | 10/1993 | (EP). |
| 0 692 911 | 1/1996 | (EP). |
| 7-322245 | 12/1995 | (JP). |

OTHER PUBLICATIONS

Bozoki et al, "Scene Adaptive Rate Control in a Distributed Parallel MPEG CIDEO Encoder", Proceedings. International Conference on Image Processing (Cat. No. 97CB36144), Proceedings of International Conference on Image Processing, IEEE Inc., vol. 2, Oct. 26–29, 1997, pp. 780–783, XP002145906.

Luo L–J et al., "A New Algorithm on MPEG–2 Target Bit–Number Allocation at Scene Changes", IEEE Transactions on Circuits and Systems for Video Technology, US, IEEE Inc., New York, vol. 7, No. 5, Oct. 1, 1997, pp. 815–819, XP000703548.

* cited by examiner

*Primary Examiner*—Chris Kelley
*Assistant Examiner*—Allen Wong
(74) *Attorney, Agent, or Firm*—Burns, Doane, Swecker & Mathis, LLP

(57) ABSTRACT

When fade-in is detected at a time ($\tau f$), the remaining number of bits (R) is increased by Rup=G/2. Thus, the remaining number of bits R to be consumed in the GOP (n) becomes (3/2)G=(12/8)G. In this way, the remaining number of bits (R) is increased when fade-in is detected. This increases the bit rate in pictures coming after fade-in and requiring a large information content, thereby improving picture quality.

5 Claims, 13 Drawing Sheets

PICTURE CODING METHOD

BACKGROUND OF THE INVENTION

1. Field of the Invention

The present invention is directed to a method for coding a picture, especially to a rate control by means of an MPEG.

2. Background of the Invention

The MPEG has been used as a method for coding a picture. Especially for an MPEG2 (Moving Picture Experts Group Phase 2) among the MPEG, a TM5 (Test Model 5) has been proposed as a model for standardization work (cf. ISO-IEC/JTC1/SC29/WG11, e.g. "Selected Book on Comprehensive Multimedia, MPEG", pp. 110–115, by Television Society, published by Ohmsha)

The TM5 suggests to optimize a picture in quality, with the number of bits generated by coding controlled to a desired number (i.e. target number of bits) in rate control.

However, in the rate control according to the TM5, a picture changes from the one requiring a small number of bits generated by coding to the one requiring a large number of bits generated by coding, for example, before and after fade-in. Handling those pictures in the same way causes deterioration in picture quality.

SUMMARY OF THE INVENTION

A first aspect of the present invention is directed to a picture coding method for coding a group of pictures consisting of pictures of a first type and of a second type which follows the picture of the first type. The picture coding method comprises the steps of: (a) setting a target number of bits generated by coding each of the pictures, with a predetermined number of bits consumed; (b) increasing the number of bits by a first number, as a first increase, when the group of pictures is updated; and (c) increasing the number of bits by a second number, as a second increase, when fade-in is detected in the group of pictures.

Preferably, according to a second aspect of the present invention, the number of bits is increased at least as a part of the second increase when the fade-in is detected.

Preferably, according to a third aspect of the present invention, the step (c) includes the step of: (c-1) increasing the number of bits only by a third number proportional to the remaining number of the pictures ranging from a first detection picture where fade-in is detected to the last picture in the group of pictures which includes the first detection picture, as a part of the second increase, when the fade-in is detected.

Preferably, according to a fourth aspect of the present invention, the step (c) further includes the step of: (c-2) increasing the number of bits, along with the first increase, by a fourth number obtained by subtracting the third number from the second number, as another part of the second increase, in the latest one of the pictures of the first type which includes the first detection picture.

Preferably, according to a fifth aspect of the present invention, the picture coding method further comprises the step of: (d) subtracting the second number in total from the number of bits at least at a time.

Preferably, according to a sixth aspect of the present invention, the step (d) is performed at least for the latest one of the pictures of the first type, after the second increase is completed.

Preferably, according to a seventh aspect of the present invention, the subtraction of the second number from the number of bits is divided over a plurality of times at the step (d).

Preferably, according to an eighth aspect of the present invention, the step (d) includes the step of : (d-1) reducing the number of bits when fade-out is detected.

Preferably, according to a ninth aspect of the present invention, the step d) further includes the step of: (d-2) reducing the number of bits at least in the latest one of the pictures of the first type, after the second increase is completed. If the fade-out is detected in the middle of the step (d-2), the step (d-1) is performed to complete the step (d).

In accordance with the first aspect of the present invention, the number of bits is increased when fade-in is detected. This increases a transfer rate, thereby preventing deterioration in picture quality.

Picture information after fade-in requires a large number of bits generated by coding. In accordance with the second aspect of the present invention, a large number of bits can be allotted to such pictures.

In accordance with the third aspect of the present invention, it is possible to avoid the possibility that the information content for the picture of the second type becomes larger than that for the picture of the first type in the group of pictures where fade-in is detected.

In accordance with the fourth aspect of the present invention, the number of bits is increased not only by the third number but also by the fourth number so as to be increased by the second number in total for each fade-in. Besides, since the increase by the fourth number is made in the first picture in the group of pictures, the correlation of the numbers of bits generated by coding between the respective pictures in the same group of pictures would not be changed.

In accordance with the fifth aspect of the present invention, always suppressed to a predetermined value or less, the number of bits can be realized with a device having a finite value such as a virtual buffer.

In accordance with the sixth aspect of the present invention, the number of bits is not reduced in the group of pictures where fade-in is detected. Thus, deterioration in picture quality, which would be especially remarkable when the remaining number of pictures in the group of pictures is small, is prevented. Besides, since the number of bits is reduced in the first picture in the group of pictures, the correlation of the numbers of bits generated by coding between the respective pictures in the same group of pictures would not be changed.

In accordance with the seventh aspect of the present invention, the reduction in the number of bits is divided and made in a plurality of groups of pictures, so that the number of bits to be reduced in each group of pictures is small. This suppresses deterioration in picture quality in those groups of pictures.

In accordance with the eighth aspect of the present invention, only a small information content is required in the pictures existing during a period after fade-out is detected until the next fade-in is detected. Thus, deterioration in picture quality during this period can be suppressed, even if the number of bits is reduced when fade-out is detected.

In accordance with the ninth aspect, even if the reduction in the number of bits is divided and made in a plurality of groups of pictures, since only a small information content is required in the pictures after fade-out, the number of bits can be reduced by the second number in total with the execution of the step (d-1).

The present invention provides the method of rate control which improves quality of pictures requiring a large number of bits generated by coding.

DESCRIPTION OF THE PREFERRED EMBODIMENTS

0. Outline

Before going on the detailed description of the preferred embodiments, the outline of the present invention will be described. In the MPEG, target numbers of bits Ti, Tp, and Tb for an I-picture, a P-picture, and a B-picture, respectively, are calculated from Equation (1):

$$Ti = \max\left\{\frac{R}{1 + \frac{NpXp}{XiKp} + \frac{NbXb}{XiKb}}, BR/(8 \times PR)\right\} \quad (1)$$

$$Tp = \max\left\{\frac{R}{Nb + \frac{NpKpXb}{KpXb}}, BR/(8 \times PR)\right\}$$

$$Tb = \max\left\{\frac{R}{Nb + \frac{NpKbXp}{KpXb}}, BR/(8 \times PR)\right\}$$

where R is the remaining number of bits; Xi, Xp and Xb are global complexity measures of the I-picture, the P-picture, and the B-picture, respectively; Np and Nb are the numbers of P-pictures and B-pictures which have not been coded in the current GOP (group of pictures), respectively; Kp and Kb are quantization parameter ratios of the P-picture and the B-picture, respectively, on the basis of a quantization scale of the I-picture (e.g. Kp=1.0, Kb=1.4); BR is a bit rate; and PR is a picture rate. In this case, Equation (2) holds:

$$Xi=SiQi \; Xp=SpQp \; Xb=SbQb \quad (2)$$

where Si, Sp and Sb are the numbers of bits generated by coding the I-picture, the P-picture and the B-picture, respectively, by which the remaining number of bits R is reduced for each coding of one picture; and Qi, Qp and Qb are average quantization parameters used for coding the I-picture, the P-picture and the B-pictures, respectively. The initial values for Xi, Xp and Xb are set as follows:

$$Xi=160 \times BR/115 \; Xp=60 \times BR \; 115 \; Xb=42 \times BR/115 \quad (3)$$

Further, for each update of the GOP, the remaining number of bits R is increased by the value G which is calculated as follows:

$$G = GOP\_N \times \frac{BR}{PR} \quad (4)$$

where GOP_N is the number of pictures which constitute the GOP.

The above-described technique follows the proposal of the TM5. Thus, the remaining number of bits R is reduced, but not increased until the GOP is updated. On the other hand, in the present invention, the remaining number of bits R is increased by the value G for each update of the GOP, and further, when fade-in is detected, temporarily increased by the increasing number Rup to increase the target number of bits. This increases the bit rate, thereby preventing deterioration in picture quality. Thus, in the present invention, the target number of bits is first appropriately set to code a picture.

Since the remaining number of bits R is realized with a virtual buffer, it is desirable to otherwise reduce the remaining number of bits R depending on the increasing number Rup so that the virtual buffer does not overflow.

1. First Preferred Embodiment

Figure 1:
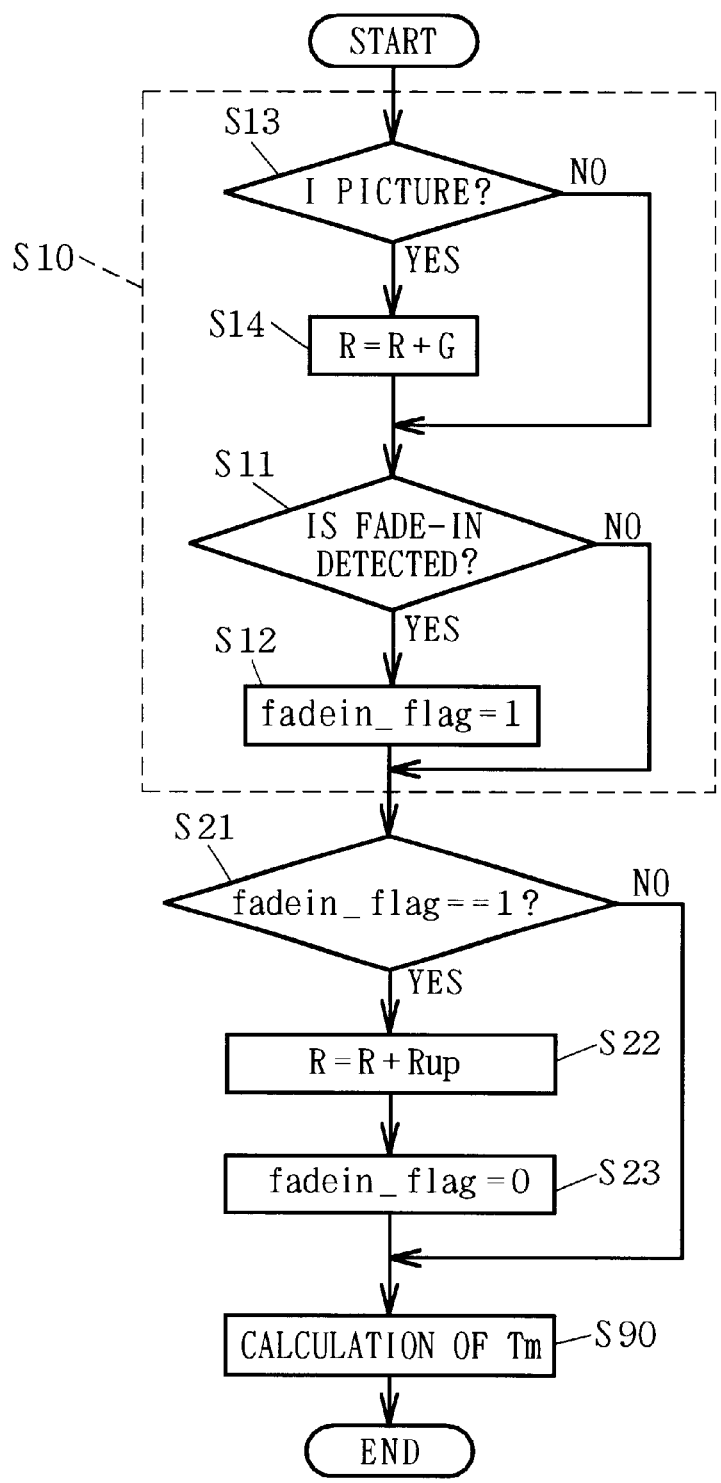
FIG. 1 is a flow chart illustrating an operation in accordance with a first preferred embodiment of the present invention.

FIG. 1 is a flow chart illustrating an operation of the picture coding method in accordance with a first preferred embodiment of the present invention. The process from START to END is repeated for each picture to obtain the respective target numbers of bits.

A step S10 consists of steps S11 through S14. At the step S13, whether the current picture is an I-picture (e.g. the first picture) in the GOP or not is determined. When the answer is "YES", the remaining number of bits R is increased by the value G at the step S14. The symbol "=" used in the step S14 of FIG. 1 indicates that the value on the left is set to the value on the right (the same applies to the other flow charts).

Next, whether fade-in is detected in the current picture or not is determined at the step S11. If fade-in is detected, a first fade-in flag fadein_flag is set to "1" at the step S12. The initial value for the first fade-in flag fadein_flag before the process starts according to this flow chart is "0".

According to the present invention, "fade-in" can be detected by finding the first moment that one pixel out of all pixels in picture having the same value comes to be different in value from the other pixels. For example, the moment that at least one pixel in a black picture is lightened can be defined as the start of fade-in. Such detection is possible with a value held in an activity register provided in the general picture coding device. The value changes, for example, from "0" to "1", more specifically becomes "0" for a black picture and "1" for the other pictures.

Then, the process proceeds to a step S21 to determine whether the first fade-in flag fadein_flag is "1" or not. If the answer is "NO", the process proceeds to a step S90 where the target number of bits is calculated from Equation (1). The symbol "==" used in the step S21 of FIG. 1 indicates a judgment whether the values on the left and on the right agree with each other or not (the same applies to the other flow charts). Further, "Tm" in the step S90 is a general term for the target numbers of bits Ti, Tp, and Tb (m=i, p, or b).

If the answer of the step S21 is "YES", the process proceeds to a step S22 where the remaining number of bits R is increased by the increasing number Rup. Then, the first fade-in flag fadein_flag is set to "0" at a step S23.

In this way, the remaining number of bits R is increased when fade-in is detected. This increases the bit rate for pictures coming after the fade-in and requiring a large information content, thereby preventing deterioration in picture quality.

Though not provided specifically, the increasing number Rup may be equal to or less than the value G obtained from Equation (4), and thus may be set to, for example, a half of the value G.

Moreover, the operation of this preferred embodiment may be possible without the first fade-in flag fadein_flag. For example, omitting the steps S12, S21 and S23, when the answer of the step S11 is "NO", the process directly proceeds to the step S90; and when "YES", the process proceeds through the step S22 to the step S90.

Figure 2:
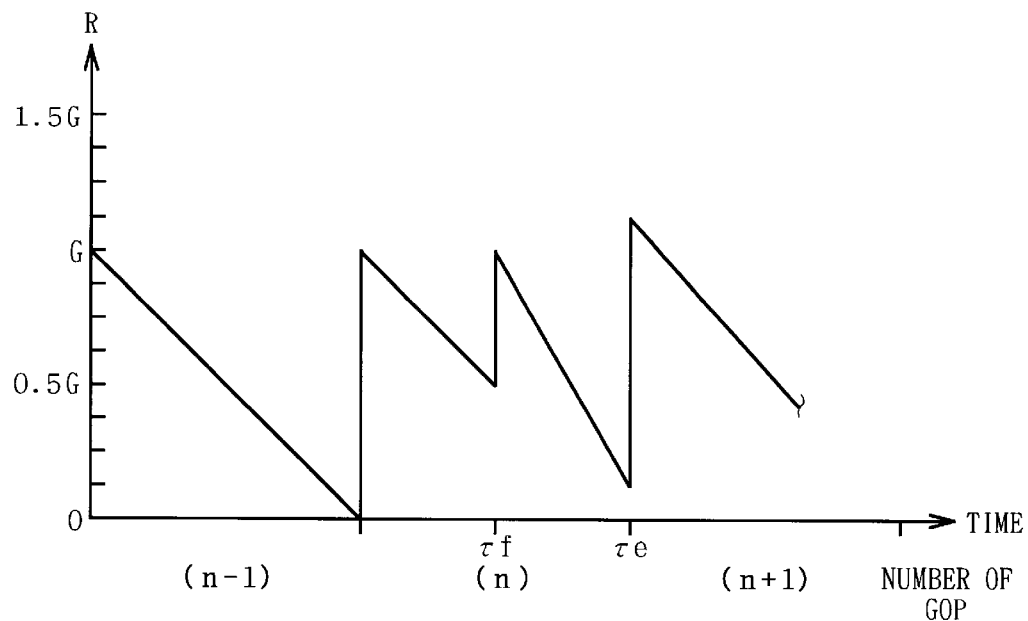
FIG. 2 is a line graph showing the remaining number of bits R in accordance the first preferred embodiment.
Figure 3:
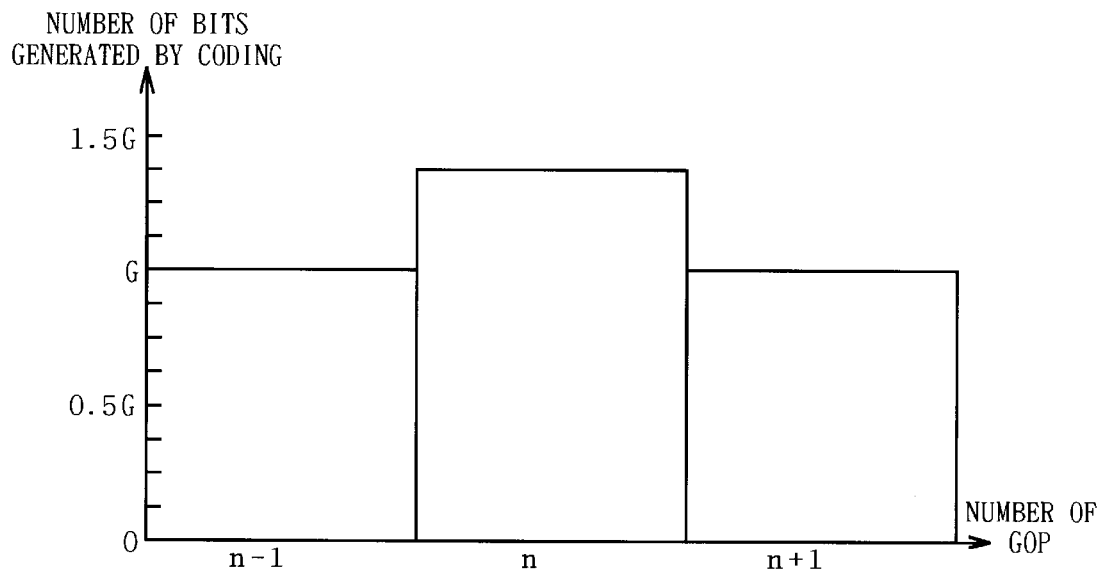
FIG. 3 is a bar graph showing a change in the number of bits generated by coding for each GOP in accordance with the first preferred embodiment.

FIGS. 2 and 3 are a line graph showing the remaining number of bits R, and a bar graph showing a change in the number of bits generated by coding for each GOP, respectively, when the process goes on according to the flow chart of FIG. 1.

As shown in FIGS. 2 and 3, it is assumed that fade-in has not occurred until the GOP (n−1), and it is detected in the GOP (n) at time τf, and that the number of bits generated by coding until the GOP (n−1) is equivalent to the value G obtained from Equation (4).

Since fade-in is detected at the time τf, the remaining number of bits R is increased by Rup=G/2. Thus, the remaining number of bits R to be consumed in the GOP (n) is (3/2)G=(12/8)G. If the number of bits generated by coding for the GOP (n) is (11/8)G, the remaining number of bits R which would not be consumed by the time τe at the end of the GOP (n) is G/8.

2. Second Preferred Embodiment

If fade-in is detected in the picture near the end of a GOP, it is desirable rather to increase the remaining number of bits R slightly in the current GOP and continuously in the next GOP so that the increasing number become equivalent to Rup in total, than to increase the remaining number of bits R by the increasing number Rup only in the current GOP.

This is because, since the first and the last pictures in the GOP are generally an I-picture and a P-picture, respectively, the information content for the P-picture is preferably smaller than that for the I-picture.

Therefore, in the picture near the end of a GOP, it is desirable rather to increase the remaining number of bits R depending on the number of pictures which have not been coded yet in the current GOP than to increase the remaining number of bits R by the increasing number Rup, which increases the information content for the P-picture. In order to supplement the increasing number, the remaining number of bits R is continuously increased, even if fade-in is not detected, in the next GOP following the current GOP in which the remaining number of bits R has been increased when fade-in is detected. Though the increase in the remaining number of bits R is divided and made in the two GOPs in this case, the total increasing number becomes equivalent to the increasing number Rup.

In the next GOP, the remaining number of bits R is preferably increased when its I-picture is detected. This is because the possibility that the information content for the I-picture becomes smaller than that for the P-picture can be avoided, and also because, in the TM5, the remaining number of bits R is increased by the value G when the first picture (i.e. I-picture) in the GOP is detected.

Figure 4:
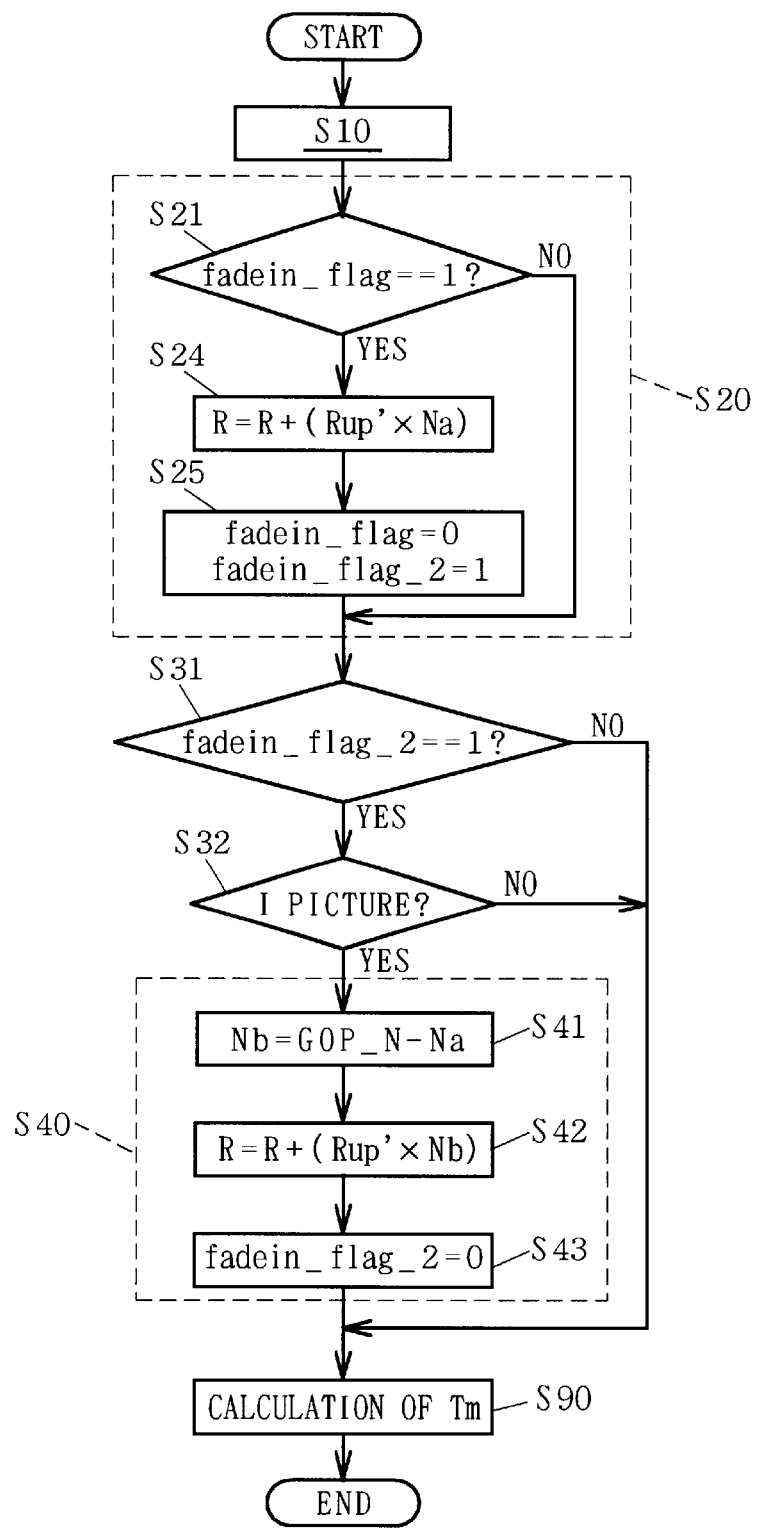
FIG. 4 is a flow chart illustrating an operation in accordance with a second preferred embodiment of the present invention.

FIG. 4 is a flow chart illustrating an operation of the picture coding method in accordance with a second preferred embodiment of the present invention. The process from START to END is repeated for each picture to obtain the respective target numbers of bits. The initial value for the first fade-in flag fadein_flag and a second fade-in flag fadein_flag_2 described later, before the process starts according to this flow chart, are both "0".

Like the first preferred embodiment, the remaining number of bits R is increased at the step S10 in accordance with the TM5, and, when fade-in is detected, the first fade-in flag fadein_flag is set to "1".

Then, the process proceeds to a step S20 which consists of steps S21, S24 and S25. When fade-in is detected in the current picture, the process goes through the step S21 to the step S24. At the step S24, the remaining number of bits R is increased. The increasing number is proportional to the remaining number of pictures Na in the current GOP, calculated as (Rup/GOP_N)×Na=Rup'×Na. Then, the first fade-in flag fadein_flag and the second fade-in flag fadein_flag_2 are set to "0" and "1", respectively.

At a step S31, the second fade-in flag fadein_flag_2 is examined. If the value is "1", the process proceeds to a step S32. At the step S32, whether the current picture is an I-picture or not is determined. When the current picture is an I-picture, either of two cases can be considered: a first case where fade-in has been detected in the I-picture in the current GOP; or a second case where fade-in has been detected in the picture except an I-picture in the previous GOP.

In the second case, the fact that the second fade-in flag fadein_flag_2 is "1" means that the remaining number of bits R has been once increased in the GOP where the fade-in is detected. The first case will be described later.

If the current picture is detected as an I-picture at the step S32, the process proceeds to a step S40 which consists of steps S41, S42 and S43. The step S41 is a preparatory step to the step S42, for obtaining the number of pictures Nb by subtracting the number of pictures Na in the step S24 from the number of pictures GOP_N which constitute one GOP.

Here, it is noted that the number of pictures Na has been obtained at the step S24 and the value is valid for different GOPs. That is, in the second case, Na is the number of pictures which had not been coded when fade-in was detected in the previous GOP, not the one in the current GOP for which the step S41 is performed.

At the step S42, the remaining number of bits R is increased. The total increasing number by this increase and the increase in the GOP where fade-in is detected becomes equivalent to the increasing number Rup. That is, the remaining number of bits R is increased only by Rup'×Nb at this step. This increase along with the increase in the GOP where the fade-in is detected, completes the increase in the remaining number of bits R necessary for one fade-in.

Then, the second fade-in flag fadein_flag_2 is set to "0" at the step S43. That is, in the second case, the fact that the second fade-in flag fadein_flag_2 is "1" means also that the remaining number of bits R has been insufficiently increased for the fade-in detected in a certain GOP.

In the first case, no substantial processing is performed at the steps S41 and S42. Since fade-in is detected in the I-picture in the current GOP, the remaining number of bits R only has to be increased by the increasing number Rup in the I-picture where the fade-in is detected. This increase has already been completed at the step S24 (Na=GOP_N). Thus, only the second fade-in flag fadein_flag_2 has to be set to "0" at the step S43. That is, since the increase in the remaining number of bits R necessary for one fade-in has been completed, no further increase in the remaining number of bits is necessary in the next GOP.

As described above, according to this preferred embodiment, when fade-in is detected in a picture except an I-picture, the increase in the remaining number of bits R is divided and made both in the GOP where the fade-in is detected and in the next GOP. This avoids the possibility that the information content for the P-picture and B-picture becomes larger than that for the I-picture.

Especially, in the GOP where the fade-in is detected, the remaining number of bits R is increased by the number proportional to the number of pictures Na which has not been coded in the current GOP. Thus, the above-described possibility can be avoided. This is true for both the first and the second cases.

As described as a modification of the first preferred embodiment, the first fade-in flag fadein_flag may not have to be used. In this case, when the answer of the step S11 is "NO", the process directly proceeds to the step S31, omitting the step S12 in the step S10. When "YES", the process proceeds through the steps S24 and S25 to the step S31, omitting the step S21. Then, at the step S25, the setting of the first fade-in flag fadein_flag is unnecessary.

Figure 5:
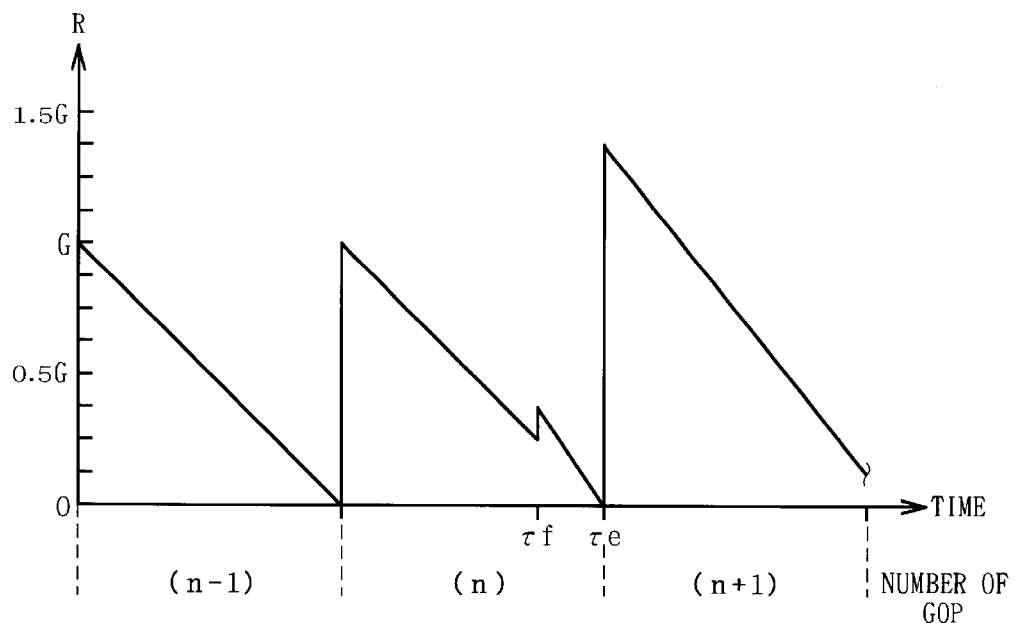
FIG. 5 is a line graph showing the remaining number of bits R in accordance with the second preferred embodiment.
Figure 6:
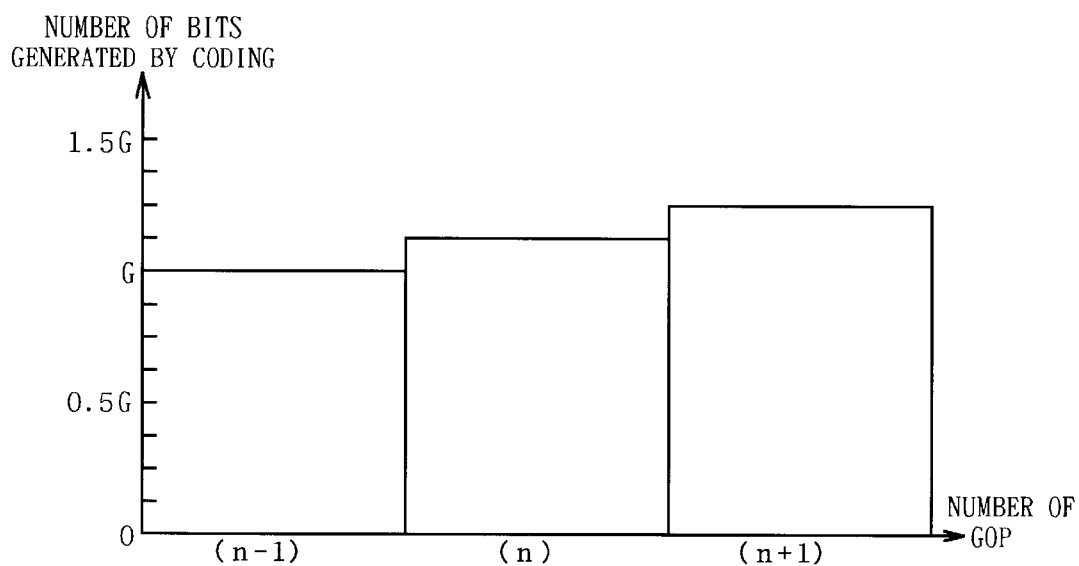
FIG. 6 is a bar graph showing a change in the number of bits generated by coding for each GOP in accordance with the second preferred embodiment.

FIGS. 5 and 6 are a line graph showing the remaining number of bits R and a bar graph showing a change in the number of bits generated by coding for each GOP, respectively, when the process is performed according to the flow chart of FIG. 4.

As shown in FIGS. 5 and 6, it is assumed that fade-in has not occurred until the GOP (n−1), and that the remaining number of bits R at the end of this GOP is "0". Then, in the GOP (n), fade-in is detected at a time τf (e.g. when the processing of the (GOP_N×3/4+1)-th picture starts).

Since fade-in is detected at the time τf, the remaining number of bits R is increased by Rup×(1−3/4)=G/8. Thus, the remaining number of bits R to be consumed in the GOP (n) is (9/8)G, so that the number of bits generated by coding for the GOP (n) is limited within this range in accordance with Equation (1). FIG. 6 shows that the number of bits generated by coding for the GOP (n) is (9/8)G, and the remaining number of bits R which would not be consumed by the time τe at the end of the GOP is "0".

At the time τe (more specifically, when the processing of the first picture (i.e. I-picture) in the GOP (n+1) which follows the current GOP starts), the remaining number of bits R is increased only by the value G at the step S14 and by Rup×3/4=(3/8)G at the step S42, that is, by (11/8)G in total. Thus, the GOP (n+1) can have a large number of bits generated by coding, for example, (10/8)G.

3. Third Preferred Embodiment

As described in the "Outline", the remaining number of bits R is preferably reduced by the increasing number Rup after fade-in is detected However, it is not desirable to reduce it always in the same GOP. If the remaining number of bits R is increased near the end of the current GOP, and then reduced in the same GOP, picture quality in the remaining pictures would possibly deteriorate since this GOP now includes only a small number of pictures which has not been coded.

In this preferred embodiment, the remaining number of bits R is reduced in the GOP following the GOP in which the fade-in is detected. Especially, it is reduced when the I-picture is detected so that no remarkable change is caused in distribution of the remaining number of bits R in the GOP following the GOP in which the fade-in is detected.

Figure 7:
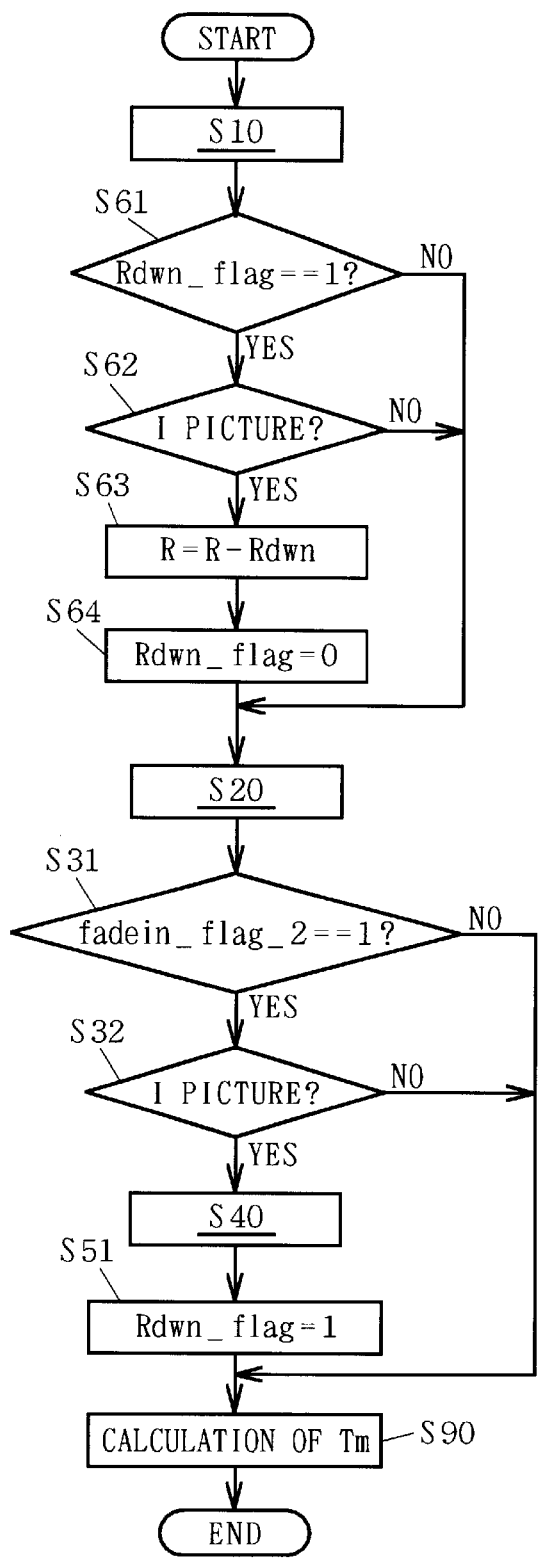
FIG. 7 is a flow chart illustrating an operation in accordance with a third preferred embodiment of the present invention.

FIG. 7 is a flow chart illustrating an operation of the picture coding method in accordance with a third preferred embodiment of the present invention. The process from START to END is repeated for each picture to obtain the respective target numbers of bits. The initial values for the first fade-in flag fadein_flag, the second fade-in flag fadein_flag_2, and a reduction flag Rdwn_flag which will be described later, before the process starts according to this flow chart, are all "0".

Like the first preferred embodiment, the remaining number of bits R is increased at the step S10 according to the TM5, and, when fade-in is detected, the first fade-in flag fadein_flag is set to "1".

Then, at a step S61, the reduction flag Rdwn_flag is examined. If the reduction flag Rdwn_flag is "1", the remaining number of bits R has already been increased by the increasing number Rup when fade-in is detected. If "0", fade-in has not been detected yet, or the remaining number of bits R has been once increased by the increasing number Rup when fade-in is detected but reduced by the reducing number Rdwn. Here, the reducing number is determined so as to be equivalent to the increasing number Rup. The setting of the reduction flag Rdwn_flag is performed at steps S64 and S51 which will be described later.

If the reduction flag Rdwn_flag is "0" at the step S61, the process proceeds to the step S20 where the remaining number of bits R in the GOP where the fade-in is detected is increased by the number proportional to the number of pictures Na which has not been coded yet in the current GOP, as described in the second preferred embodiment. Then, the process goes to the step S31. At the steps S31, S32 and S40, the remaining number of bits R is complementary increased as described in the second preferred embodiment. Further, if the answer of either steps S31 or S32 is "NO", like the second preferred embodiment, the target number of bits Tm is calculated at the step S90.

From the step S20 downward, this flow chart is different from that of the second preferred embodiment only in that the reduction flag Rdwn_flag is set to "1" at a step S51 between the step S40, which is performed when the answers of both the steps S31 and S32 are "YES", and the step S90.

If the step S40 is performed, the remaining number of bits R has already been increased by the increasing number Rup for the detected fade-in, irrespective of the first and the second case of the second preferred embodiment. Thus, the reduction flag Rdwn_flag is set to "1" and the value is valid for a plurality of pictures to reduce the remaining number of bits R in the I-picture in the next GOP.

For pictures to be processed after the reduction flag Rdwn_flag is set to "1", the process proceeds from the step S61 to the step S62 according to the flow chart of FIG. 7. If the current picture is not an I-picture, the process proceeds to the step S20 without performing the steps S63 and S64 so that the remaining number of bits R is not reduced in the GOP for which the step S40 has already been performed.

At the step S63, the remaining number of bits R is reduced, and at the following step S64, the reduction flag Rdwn_flag is set to "0". This is because no further reduction in the remaining number of bits R is necessary.

As described above, according to this preferred embodiment, the remaining number of bits R increased by a predetermined number due to fade-in is reduced by the same number as the increasing number in the first picture in the next GOP. Thus, the remaining number of bits R is not reduced in the same GOP. This prevents a remarkable change in distribution of the remaining number of bits R, and overflow of the virtual buffer realizing the remaining number of bits R.

Performed only based on the reduction flag Rdwn_flag and the type of picture in process, the steps S61 through S64 may be positioned before the step S10 or between the step S20 and the step S31, but preferably after the steps S13 and S14 in the step S10 so that the remaining number of bits R would not be negative after the execution of the step S63.

Figure 8:
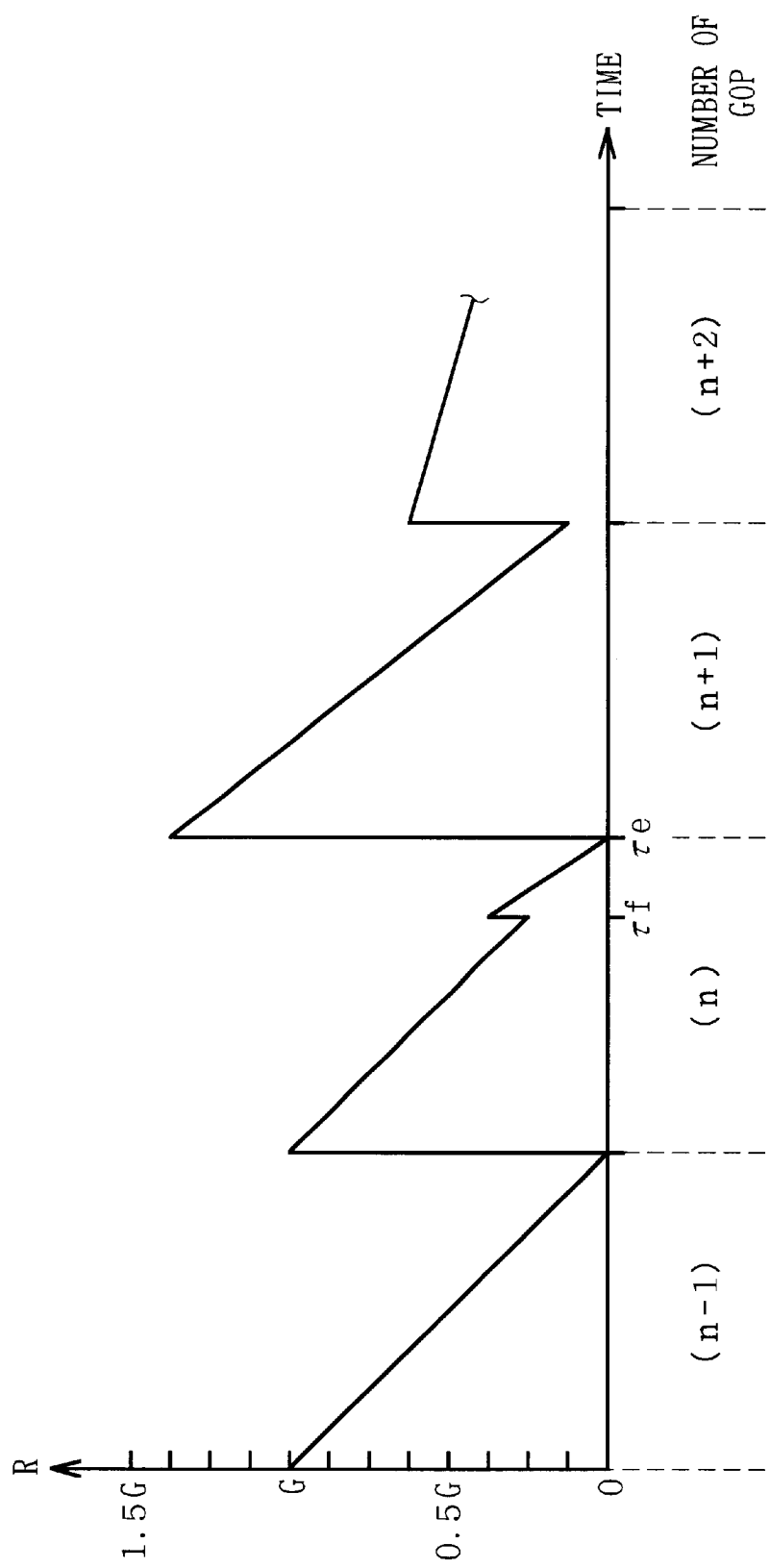
FIG. 8 is a line graph showing the remaining number of bits R in accordance with the third preferred embodiment.

FIG. 8 is a line graph showing the remaining number of bits R in the process shown in FIG. 7. The conditions until the processing of the GOP (n) is completed are the same with those shown in FIG. 5 of the second preferred embodiment. As shown in the figure, the remaining number of bits at the end of the GOP (n+1) is assumed to be (1/8)G. The reduction flag Rdwn_flag is set to "1" when the I-picture (the first picture) in the GOP (n+1), is processed according to the flow chart shown in FIG. 7.

When the I-picture (the first picture) in the GOP (n+2) becomes a candidate for processing, the remaining number of bits R is increased by the value G at the step S14 in the step S10, while reduced by the reducing number Rdwn= Rup=G/2 at the step S63. Thus, the remaining number of bits R in the first picture in the GOP (n+2) is (1/8)G+G−G/2= (5/8)G.

4. Fourth Preferred Embodiment

It is further desirable to reduce the remaining number of bits R in a plurality of GOPs rather than only in one GOP, in terms of prevention of deterioration in picture quality.

Figure 9:
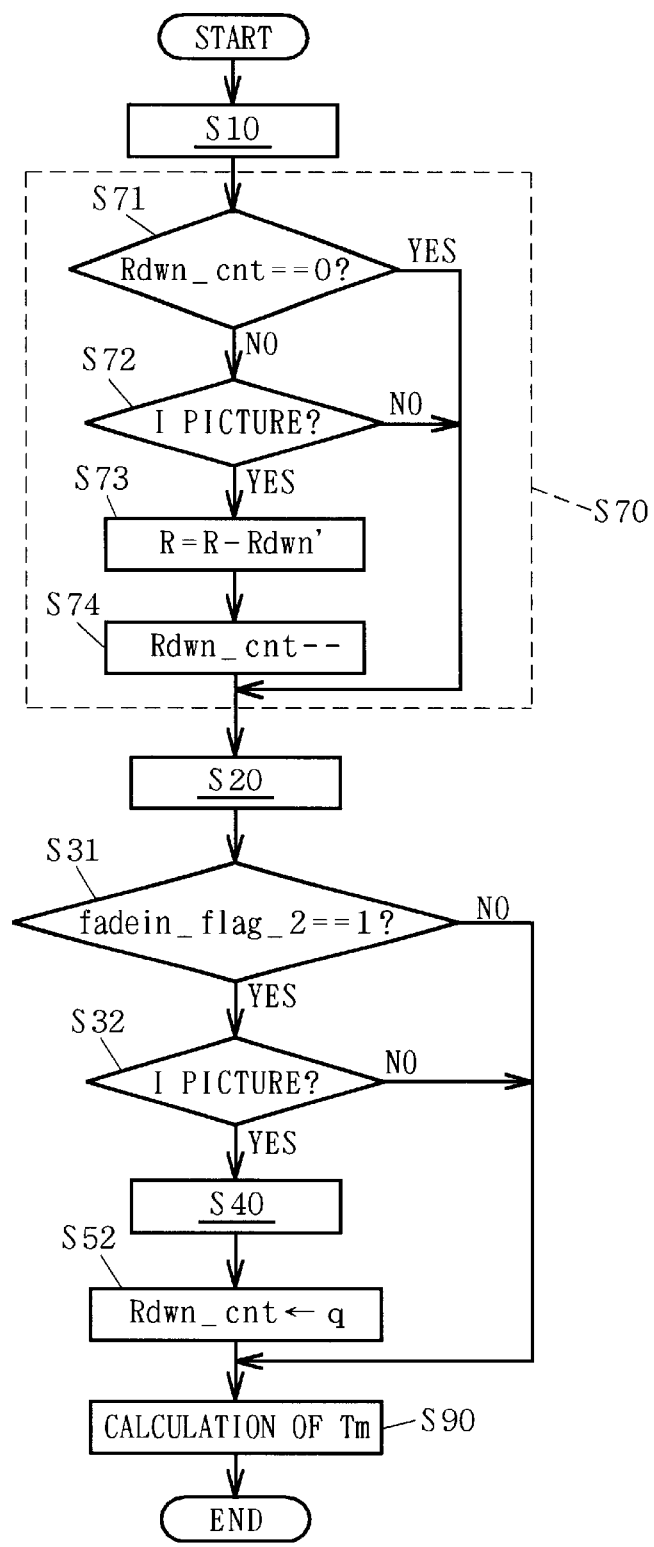
FIG. 9 is a flow chart illustrating an operation in accordance with a fourth preferred embodiment of the present invention.

FIG. 9 is a flow chart illustrating an operation of the picture coding, method in accordance with a fourth preferred embodiment of the present invention. The process from START to END is repeated for each picture to obtain the respective target numbers of bits. The initial values for the first fade-in flag fadein_flag, the second fade-in flag fadein_flag_2, and a count number Rdwn_cnt which will described later, before the process starts according to this flow chart, are all "0".

Like the first preferred embodiment, at the step S10, the remaining number of bits R is increased according to the TM5, and, when fade-in is detected, the first fade-in flag fadein_flag is set to "1".

Then, the process proceeds to a step S70 which consists of steps S71 through S74. At the step S71, the count number Rdwn_cnt is examined. When the count number Rdwn_cnt is "0", either of two cases can be considered: a first case where fade-in has not been detected yet; or a second case where the remaining number of bits R has been once increased by the increasing number Rup when fade-in is detected but reduced plural times so that the total reducing number is equivalent to the increasing number Rup. The setting of the count number Rdwn_cnt is performed at steps S74 and S52 which will be described later.

If the count number Rdwn_cnt is "0" at the step S71, the process proceeds to the step S20. The process from the step S20 to the step S90 shown in FIG. 9 is different from that shown in FIG. 7 only in that the step S51 is substituted by the step S52.

If the step S40 is performed, the remaining number of bits R has already been increased by the increasing number Rup for the detected fade-in, irrespective of the first and second cases of the second preferred embodiment. Thus, the count number Rdwn_cnt is set to "q" and the value is valid for a plurality of pictures, in order to reduce the remaining number of bits R in the I-pictures in the following plurality of GOPs (for example "q" GOPs).

When the count number Rdwn_cnt is not "0" at the step S71, the process proceeds to the step S72 according to the flow chart of FIG. 9. If the picture is not an I-picture, the process proceeds to the step S20 without performing the steps S73 and S74. The presence of the step S72 avoids the possibility that the remaining number of bits R is reduced in the GOP for which the step S40 has already been performed, and further makes it possible to reduce the remaining number of bits R in the I-pictures in the following "q" GOPs.

The value of the count number Rdwn_cnt indicates how many times the remaining number of bits R has to be further reduced for one increasing number Rup. More specifically, the remaining number of bits R is reduced at the step S73, and then the count number Rdwn_cnt is reduced by 1 at the step S74. The symbol "−−" used in the step S74 of FIG. 9 indicates that the value is reduced by 1 (the same applies to the following flow charts). Here, the reducing number Rdwn' in the step S73, by which the remaining number of bits R is reduced, is set so as to be equivalent to Rup/q.

As described above, according to this preferred embodiment, the remaining number of bits R which has been increased by a predetermined number due to fade-in is reduced by the same number as the increasing number in the first pictures in the following plurality of GOPs. Thus, besides the effect of the third preferred embodiment, this preferred embodiment has the advantage that picture quality would not deteriorate considerably.

Performed only based on the count number Rdwn_cnt and the type of picture in process, the step S70 may be positioned before the step S10 or between the steps S20 and S31, but preferably at least after the steps S13 and S14 in the step S10 so that the remaining number of bits R would not be negative after the execution of the step S73.

Figure 10:
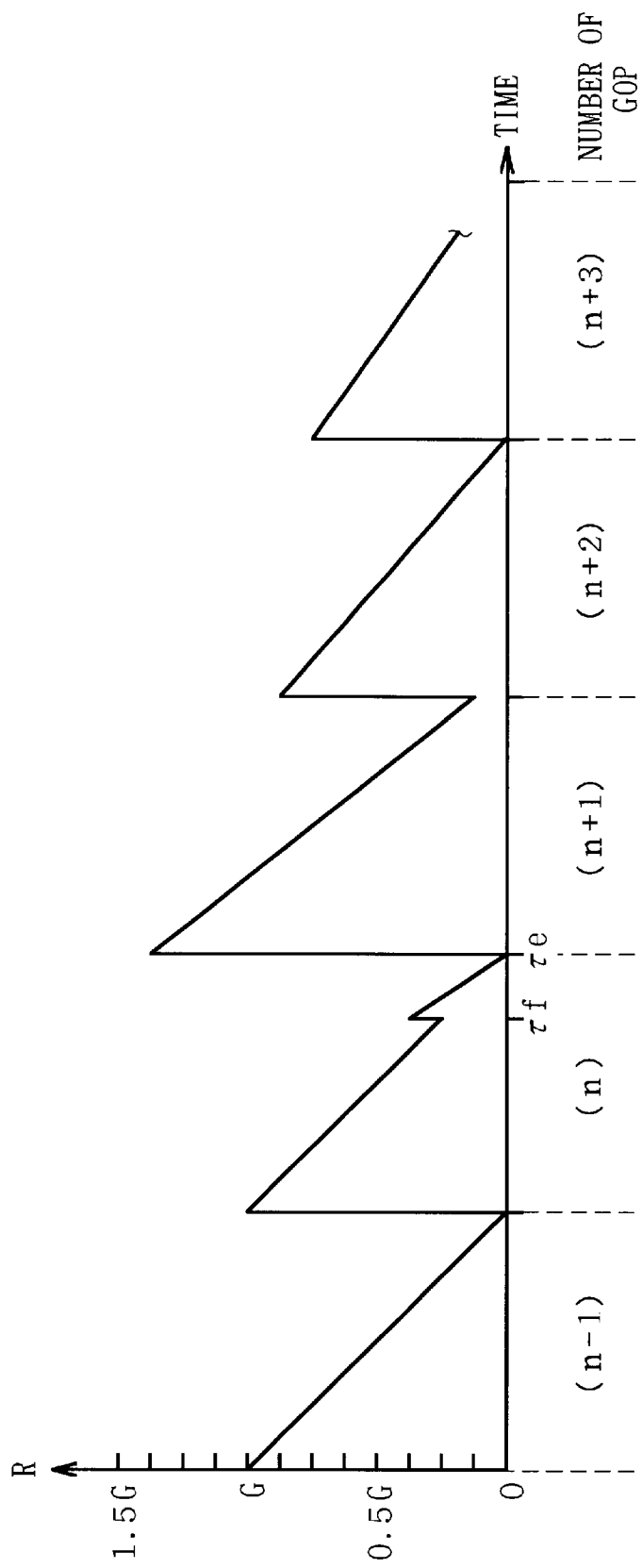
FIG. 10 is a line graph showing the remaining number of bits R in accordance with the fourth preferred embodiment.

FIG. 10 is a line graph showing the remaining number of bits R when the process is performed according to the flow chart of FIG. 9. The conditions until the processing of the GOP (n+1) is completed is the same as those shown in FIG. 5 of the second preferred embodiment. As shown in the figure, the remaining number of bits R at the end of the GOP (n+1) is assumed to be (1/8)G. When the I-picture (the first picture) in the GOP (n+1), is processed, the count number Rdwm_cnt is set to "q=2".

When the I-picture (the first picture) in the GOP (n+2) becomes a candidate for processing, the remaining number of bits R is increased by the value G at the step S14 in the step S10, while reduced by the reducing number Rdwn'= Rup/2=G/4 at the step S73. Thus, the remaining number of bits R in the first picture in the GOP (n+2) is (1/8)G+G−G/4=(7/8)G. Further, the count number Rdwn_cnt is reduced by 1 to be "1".

Since the remaining number of bits R in the first picture in the GOP (n+2) becomes larger than that shown in FIG. 8 of the third preferred embodiment, the number of bits generated by coding in the GOP (n+2) can be also larger than that of the third preferred embodiment. This avoids the possibility that picture quality considerably deteriorates due to the reduction in the remaining number of bits R.

If the number of bit generated by coding in the GOP (n+2) is (7/8)G, for example, the remaining number of bits at the end of the GOP becomes "0". When the I-picture (the first picture) in the following GOP (n+3) becomes a candidate for processing, the remaining number of bits R becomes 0+G−G/4=(3/4)G.

5. Fifth Preferred Embodiment

The third and fourth preferred embodiment show the cases that the remaining number of bits R is increased when fade-in is detected, and then reduced. However, if occurrence of fade-in is previously known, the remaining number of bits R may be reduced before increased. In this preferred embodiment, occurrence of fade-in is predicted by detecting fade-out.

According to the present invention, "fade-out" can be detected by finding the first moment that the values of all pixels in a picture become the same. For example, the moment that a picture becomes black as a whole can be defined as the start of fade-out. Such detection is possible with the value in the activity register. The value changes, for example, from "1" to "0".

Figure 11:
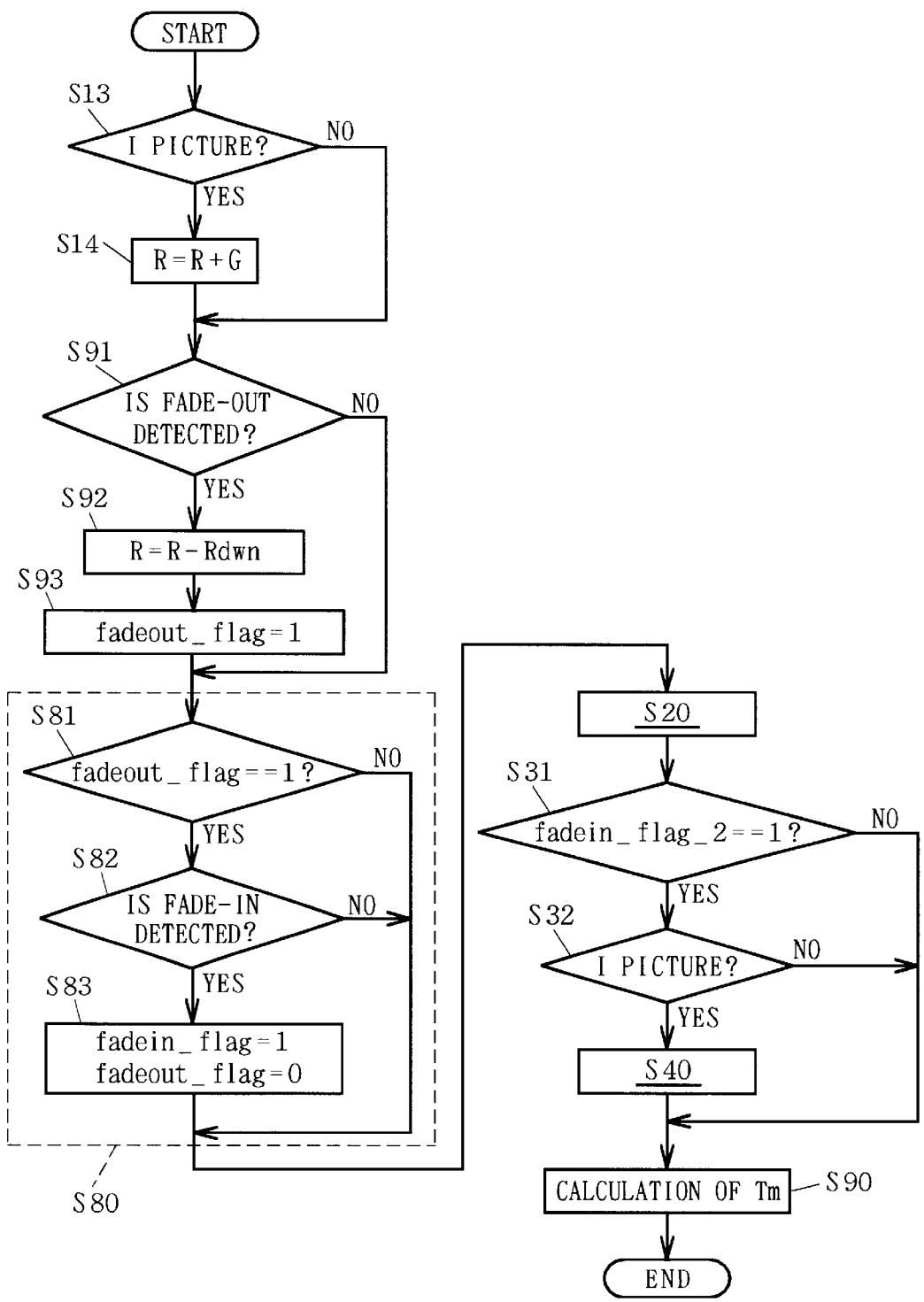
FIG. 11 is a flow chart illustrating an operation in accordance with a fifth preferred embodiment of the present invention.

FIG. 11 is a flow chart illustrating an operation of the picture coding method in accordance with a fifth preferred embodiment of the present invention. The process from START to END is repeated for each picture to obtain the respective target numbers of bits. The initial values for the first fade-in flag fadein_flag, the second fade-in flag fadein_flag_2, and a fade-out flag fadeout_flag described later, before the process starts according to this flow chart, are all "0".

First, like the first preferred embodiment, the remaining number of bits R is increased according to the TM5 at the step S13 and S14.

If fade-out is detected at a step S91, the process proceeds to a step S92 to subtract the reducing number Rdwn from the remaining number of bits R. The reducing number Rdwn is determined so as to be equivalent to the increasing number Rup, as is the case with the third preferred embodiment. Then, the fade-out flag fadeout_flag is set to "1" at a step S93.

When fade-out is not detected at the step S91, or when the step S93 is completed in the above-described case, the process proceeds to a step S80 which consists of steps S81 through S83.

At the step S81, whether the fade-out flag fadeout_flag is "1" or not is determined. If the answer of the step S81 is "YES", the process proceeds to the step S82 where whether fade-in is detected or not is determined. If the answer of the step S82 is "NO", the process proceeds to the step S20.

Suppose that the fade-out flag fadeout_flag is "1" at the step S81 and fade-in is detected at the step S82. This is the case where fade-in is detected in a picture coming after a picture in which fade-out has been detected. In such case, at the step S83, the first fade-in flag fadein_flag is set to "1", while the fade-out flag fadeout_flag is set to "0". That is, if the fade-out flag fadeout_flag is "1", fade-out has been detected but the corresponding fade-in has not been detected yet.

After the step S83, the process proceeds to the step S20. The flow chart after the step S20 is the same as that in the second preferred embodiment in which the remaining number of bits R is increased when fade-in is detected, so that the detail description will be omitted.

As described above, according to this preferred embodiment, the remaining number of bits R is previously reduced, so that it is unnecessary to reduce it in the following GOP corresponding to the increase in the remaining number of bits R when fade-in is detected. Further, even if the remaining number of bits R is reduced at the moment that fade-out is detected, picture quality hardly deteriorates since the number of bits generated by coding is small in pictures existing during a period after fade-out is detected until the next fade-in is detected. Besides, the number of bits generated by coding in pictures except that period would not change, so that deterioration in picture quality can be suppressed as a whole.

Figure 12:
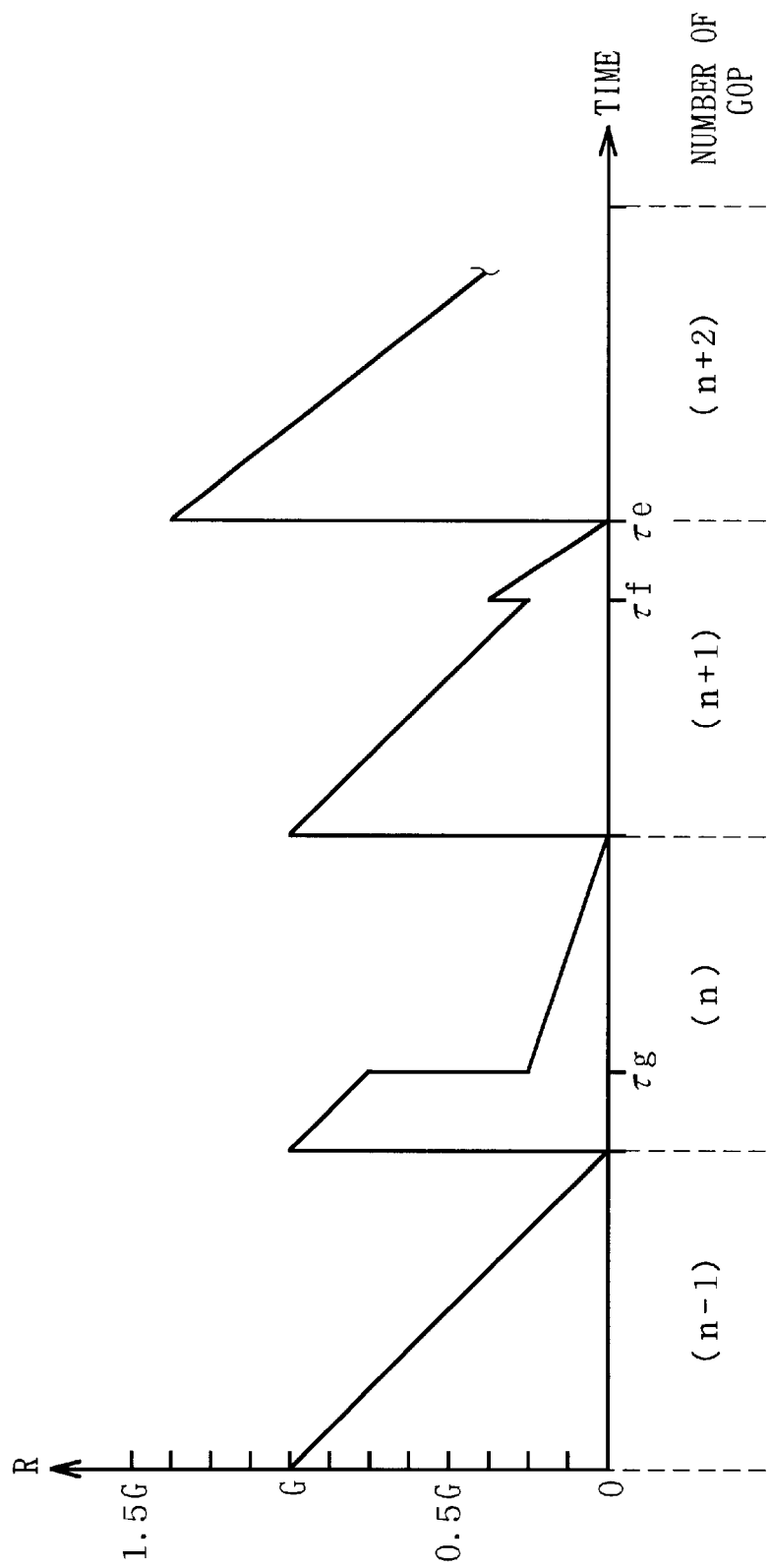
FIG. 12 is a line graph showing the remaining number of bits R in accordance with the fifth preferred embodiment.

FIG. 12 is a line graph showing the remaining number of bits R when the process is performed according to the flow chart of FIG. 11. The conditions until the processing of the GOP (n−1) is completed is the same as that shown in FIG. 5 of the second preferred embodiment. After the I-picture (the first picture) in the GOP (n), goes through the steps S13 and S14 of FIG. 11, the remaining number of bits R becomes equivalent to the value G.

If fade-out is detected at the time τg during the processing of the GOP (n), the remaining number of bits R is reduced only by Rdwn=0.5 G. In this case, the remaining number of bits R at the end of the processing of the GOP (n) is assumed to be "0".

Then, after the I-picture (the first picture) in the GOP (n+1) is processed at the step S14, the remaining number of bits R becomes equivalent to the value G. If fade-in is detected at the time τf during the processing of the GOP (n+1), the remaining number of bits R is increased as in the second preferred embodiment. That is, the remaining numbers of bits R in the GOPs (n+1) and (n+2) shown in FIG. 12 change in the same way as those in the GOPs (n) and (n+1) shown in FIG. 5.

Figure 13:
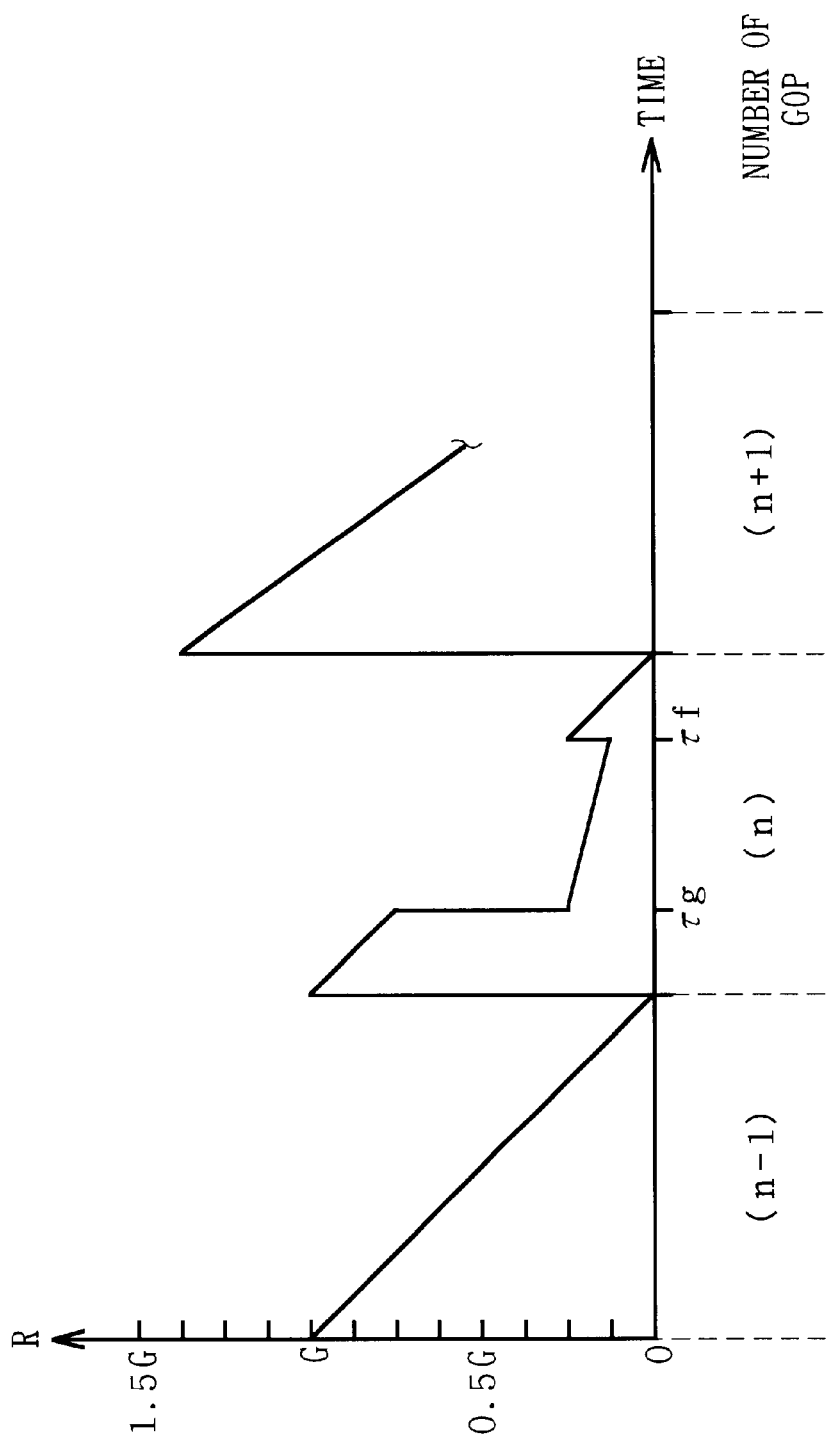
FIG. 13 is a line graph showing the remaining number of bits R in accordance with a modification of the fifth preferred embodiment.

Of course, the present invention is applicable to the case where fade-in is detected in the GOP where fade-out is detected. FIG. 13 is a graph showing a change in the remaining number of bits R when fade-in and fade-out are detected in the GOP (n) at the time τg and τf, respectively, as a modification of this preferred embodiment.

6. Sixth Preferred Embodiment

Once a picture fades in, fade-out always occurs before the next fade-in occurs. Employing this feature, this preferred embodiment adds the following operation to the operation of the fourth preferred embodiment That is, in a plurality of GOPs following the GOP where fade-in is detected, the remaining number of bits R is supposed to be reduced by the number dividing the reducing number several times. However, when fade-out is detected, the remaining number of bits R is reduced by the remaining number at a time.

Figure 14:
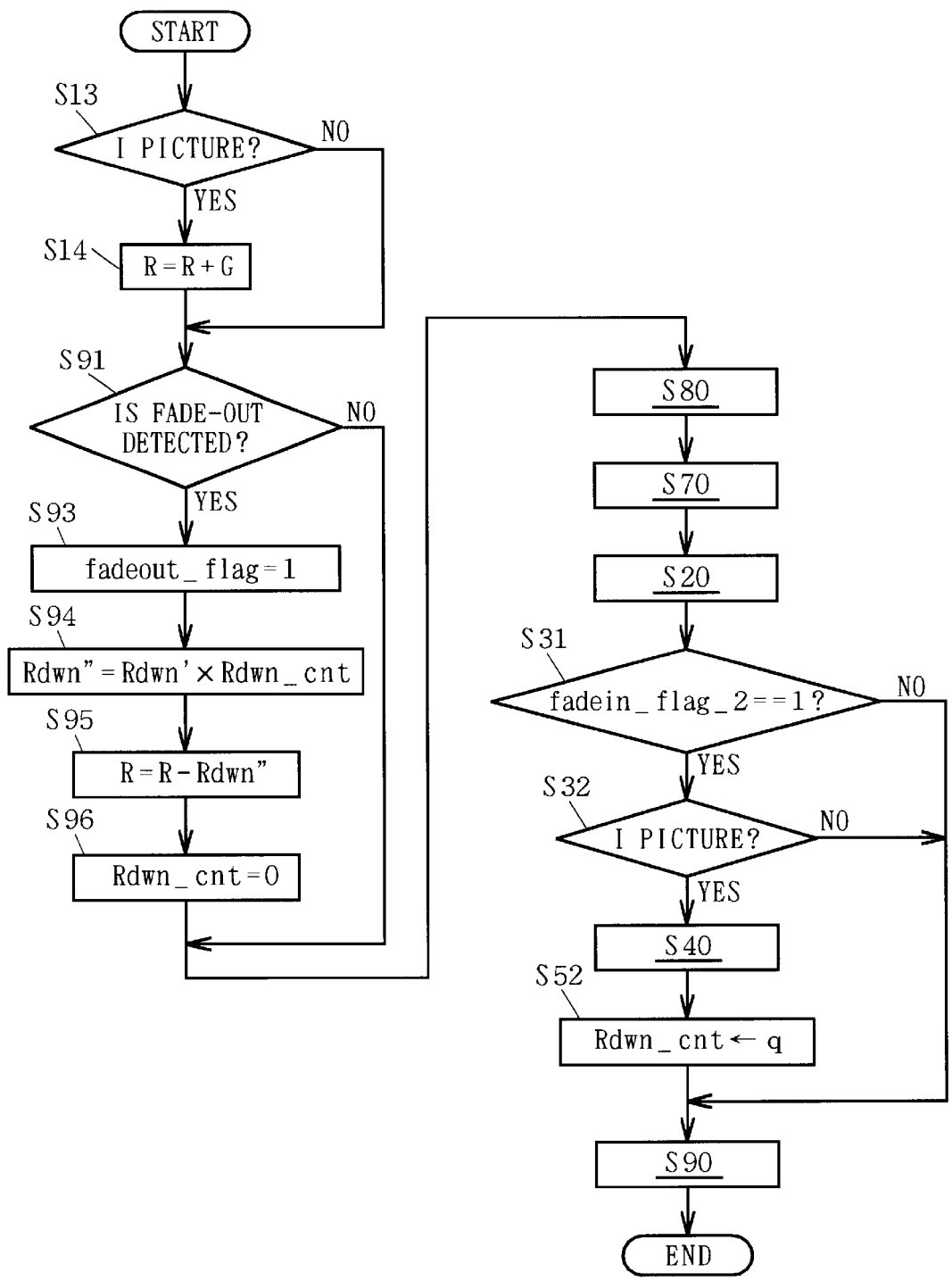
FIG. 14 is a flow chart illustrating an operation in accordance with a six preferred embodiment of the present invention.

FIG. 14 is a flow chart illustrating an operation of the picture decoding method in accordance with a sixth preferred embodiment of the present invention. The process from START to END is repeated for each picture to obtain the respective target numbers of bits. The initial values for the first fade-in flag fadein_flag, the second fade-in flag fadein_flag_2, the fade-out flag fadeout_flag, the count number Rdwn_cnt, and the reduction flag Rdwn_flag, before the process starts according to this flow chart, are all "0".

First, like the first preferred embodiment, the remaining number of bits R is increased according to the TM5 at the steps S13 and S14.

At a step S91, whether fade-out is detected or not is determined. If fade-in is not detected, the process proceeds through the step S80 to the step S70. The process after the step S70 is the same as that in the fourth preferred embodiment, so that the detail description will be omitted.

If fade-out is detected at the step S91, the process proceeds to the step S93 where the fadeout flag fadeout_flag is set to "1". Then, the reducing number Rdwn" which has not been subtracted yet out of the reducing number Rdwn, is defined as Rdwn'×Rdwn_cnt at a step S94. This number indicates the number which has not been reduced from the remaining number of bits R out of the reducing number Rdwn to be reduced for each fade-in.

When fade-in has never been detected, or when no further reduction is necessary because the reducing number Rdwn has already been subtracted from the remaining number of bits R, the count number Rdwn_cnt at the step S94 is set to "0" by initialization or by the process at the step S73 in the step S70. In this case, the step S95 has substantially no meaning.

On the other hand, when fade-in has been once detected in either of the GOPs, the count number Rdwn_cnt is positive at the step S94 to reduce the remaining number of bits R by the reducing number Rdwn' at least one time.

At the step S95, only the reducing number Rdwn" is subtracted from the remaining number of bits R, so that the remaining number of bits R is reduced by the reducing number Rdwn in total. Thus, no further reduction is necessary until the next fade-in is detected. Then, the count number Rdwn_cnt is set to "0" at the step S96, and the process proceeds to the step S80.

At the step S80, as described in the fifth preferred embodiment, when fade-in is detected, the first fade-in flag fadein_flag indicating the necessity of the increase in the remaining number of bits R is set to "1", while the fade-out flag fadeout_flag is set to "0".

The step S95 is performed irrespective of the type of the current picture. As described in the fifth preferred embodiment, the number of bits generated by coding is small in pictures existing during a period after fade-out is detected until fade-in is detected. Thus, even if the remaining number of bits R is reduced in the picture where fade-out is detected, picture quality would hardly deteriorate.

Figure 15:
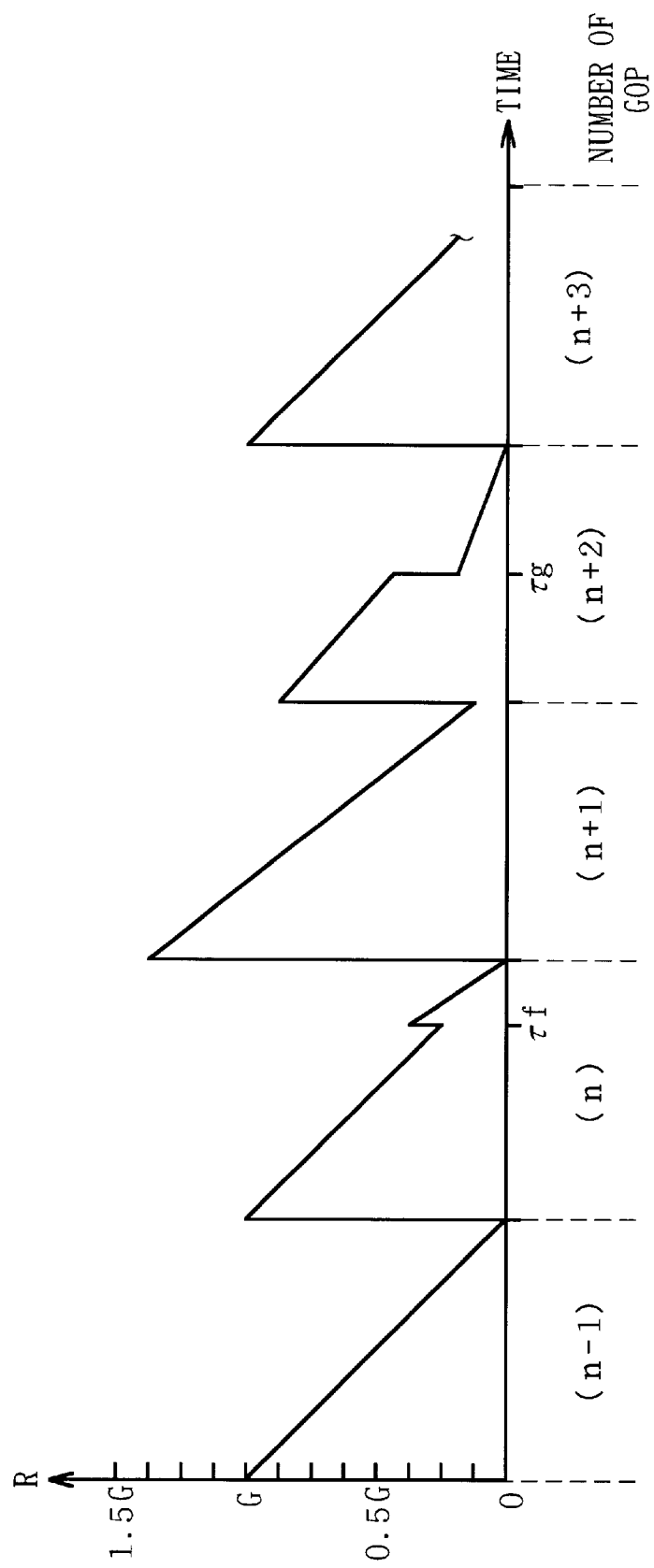
FIG. 15 is a line graph showing the remaining number of bits R in accordance with a modification of the sixth preferred embodiment.

FIG. 15 is a line graph showing the remaining number of bits R when the process is performed according to the flow chart of FIG. 14. The conditions until the processing of the GOP (n−1) is completed is the same with those shown in FIG. 5 of the second preferred embodiment. After the I-picture (the first picture) in the GOP (n) is processed at the steps S13 and S14 of FIG. 11, the remaining number of bits R becomes equivalent to the value G.

If fade-in is detected at the time τf during the processing of the GOP (n), the remaining number of bits R is increased in proportion to the number of pictures Na which have not been coded in the GOP (n), at the step S20. The figure shows that the remaining number of bits R becomes "0" at the end of the GOP (n).

In the I-picture (the first picture) in the GOP (n+1), the remaining number of bits R is increased by the value G at the step S13, and further increased by the remaining number to be increased at the step S42 in the step S40.

Further, in the beginning of the GOP (n+2), the remaining number of bits R is increased by the value G at the step S13, while reduced by G/4 (when q=2) at the step S73. Thus, the total increasing number is (3/4)G. If fade-out is detected at the time τg in the GOP (n+2), the remaining number of bits R is reduced by Rdwn−(G/4)=G/2−G/4=G/4 at the step S95.

7. Modification

In the above-described preferred embodiments, fade-in and fade-out may be detected on the basis of other criteria. For example, fade-in can be detected by finding the moment that the number of pixels having the same value, which has been larger than a certain reference value, becomes smaller than the reference value. In the same way, fade-out can be detected by finding the moment that the number of pixels having the same value, which has been smaller than a certain reference value, becomes larger than the reference value. As long as fade-in and fade-out can be detected, any criterion can be used in the present invention.

While the invention has been described in detail, the foregoing description is in all aspects illustrative and not restrictive. It is understood that numerous other modifications and variations can be devised without departing from the scope of the invention.

We claim:

1. A picture coding method for coding a group of pictures consisting of pictures of a first type and of a second type which follows said picture of the first type, said picture coding method comprising the steps of:
   (a) consuming a remaining number of bits by coding each of said pictures;
   (b) increasing said remaining number of bits by a first number, as a first increase, when said group of pictures is updated; and
   (c) increasing said remaining number of bits by a second number, as a second increase, when fade-in is detected in said picture of said first type or said picture of said second type,
   wherein said remaining number of bits is increased at least as a part of said second increase when said fade-in is detected, and
   wherein said step (c) includes the step of:
      (c-1) increasing said remaining number of bits only by a third number proportional to a remaining number of said pictures ranging from a first detection picture when fade-in is detected to the last picture in said group of pictures which includes said first detection picture, as a part of said second increase, when said fade-in is detected.

2. A picture coding method for coding a group of pictures consisting of pictures of a first type and of a second type which follows said picture of the first type, said picture coding method comprising the steps of:
   (a) consuming a remaining number of bits by coding each of said pictures;
   (b) increasing said remaining number of bits by a first number, as a first increase, when said group of pictures is updated;
   (c) increasing said remaining number of bits by a second number, as a second increase, when fade-in is detected in said picture of said first type or said picture of said second type; and
   (d) subtracting said second number in total from said remaining number of bits at least at a time,
   wherein said step (d) includes the steps of:
      (d-1) reducing said remaining number of bits when fade-out is detected, and
      (d-2) reducing said remaining number of bits at least in the latest one of said pictures of the first type, after said second increase is completed,
   wherein, if said fade-out is detected in the middle of said step (d-2), said step (d-1) is performed to complete said step (d).

3. The picture coding method according to claim 1, wherein
   said third number is obtained by multiplying said remaining number of said pictures by said second number and dividing the multiplied value by the total number of pictures in said group of pictures.

4. The picture coding method according to claim 3, wherein said step (c) further includes the step of:
   (c-2) increasing said remaining number of bits, along with said first increase, by a fourth number obtained by subtracting said third number from said second number, as another part of said second increase, in the latest one of said pictures of the first type which includes said first detection picture.

5. The picture coding method according to claim 4, wherein
   said third number is equal to said second number, and said fourth number is zero, when said first detection picture is one of said pictures of the first type.

* * * * *